Oct. 19, 1965 SHIRO OKAMURA 3,213,204
MAGNETIC TAPE RECORDER
Filed March 21, 1961 3 Sheets-Sheet 1

INVENTOR
SHIRO OKAMURA
BY Roy C. Hopgood
ATTORNEY

INVENTOR
SHIRO OKAMURA
BY Roy C. Hopgood
ATTORNEY

Oct. 19, 1965 SHIRO OKAMURA 3,213,204

MAGNETIC TAPE RECORDER

Filed March 21, 1961 3 Sheets-Sheet 3

INVENTOR
SHIRO OKAMURA
BY Roy C. Hopgood
ATTORNEY

United States Patent Office 3,213,204
Patented Oct. 19, 1965

3,213,204

MAGNETIC TAPE RECORDER

Shiro Okamura, % Nippon Electric Co. Ltd., 2 Shikoku-machi, Shiba-mita Minatoku, Tokyo, Japan Filed Mar. 21, 1961, Ser. No. 97,356
7 Claims. (Cl. 179—100.2)

This invention relates to a magnetic tape recorder especially, though not exclusively, suitable for recording and reproducing video signals.

In the video tape recorders of the prior art it is necessary for the reproducing head to trace exactly the recorded tracks. For this purpose, a capstan motor of controlled velocity has been provided, the velocity depending on the rate of the variation of the standard signal derived from the control track recorded along the length of the tape. Therefore, it has generally been necessary to use two motors, whereby the construction and the circuitry have become very complicated.

Accordingly, one object of this invention is to provide tape recording equipment of comparatively simple structure employing a single motor which serves both for rotating the head assembly and for pulling the tape.

Another object of this invention is to provide a servo system whereby the reproducing head assembly is able to trace the recorded track exactly.

According to one aspect of this invention, there is provided a magnetic tape recorder having means for rotatively scanning a tape form recording medium obliquely. The recording medium is pulled by means of a capstan assembly which is directly coupled to the same motor which produces the rotative scanning.

According to another aspect of the invention, there is provided a magnetic tape recorder having means for rotatively scanning a tape form recording medium obliquely, and means for pulling the recording medium by means of a capstan assembly variably coupled to the same motor which produces the rotative scanning.

The above mentioned and other features and objects of this invention and the manner of attaining them will become more apparent and the invention itself will be best understood by reference to the following description of an embodiment of the invention taken in conjunction with the accompanying drawing, wherein.

Figures 1, 2:
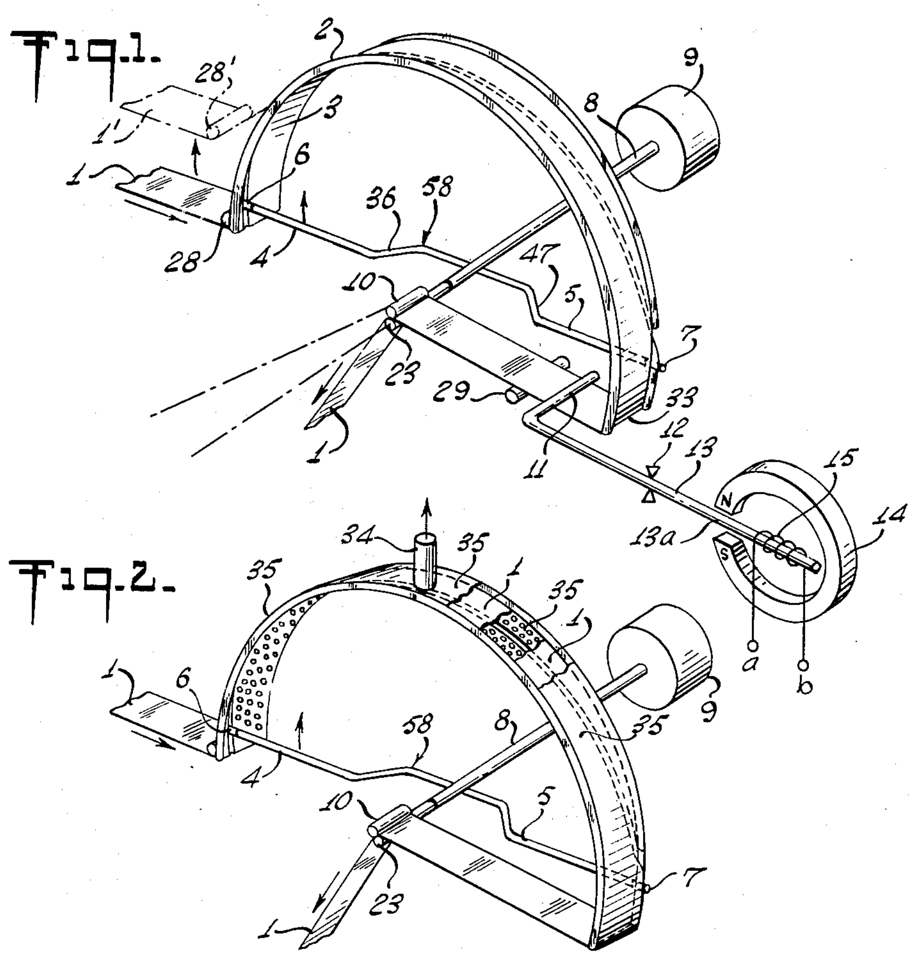
FIG. 1 is a simplified perspective diagram of one embodiment of the invention.
FIG. 2 is a simplified diagram of another embodiment of the invention, utilizing the suction of air.

In FIG. 1, there is shown a magnetic tape 1 driven in the direction of the arrowhead via a roll 28, and semicircular shaped guides 2 and 3. The tape 1 is pulled between a capstan 23, and preferably a friction roller 10. The guides 2 and 3 are supported by suitable means at the outer surfaces, which is omitted for simplicity. The tape 1 is curved over an arc during movement thereof.

Between the semi-circular guides there is a gap (shown by heavy line), into which two substantially symmetrical magnetic heads 6, 7 alternately travel, the heads being supported by two links 4 and 5 respectively, which are connected to the rotating shaft 8 of the motor 9. Thus, rotation of the motor 9 yields a group of recorded tracks 18 (FIG. 4) on the underside of the arcuate portion of the tape 1. The inclination of the recorded tracks 18 are arbitrarily chosen by the relative dimensions and size of the apparatus, and by the inclination of the shaft 8 relative to the axis of the arcuate guides 2, 3. Alternatively, the shape of the guides 2 and 3 instead of being a circular arc, may be a part of an ellipse, a helix or other suitable shape.

The shape of the guides 2 and 3 may be one-third, one-fourth, or more, of a full circle, and the number of heads may be three, four or more. Additional guides may be provided at the edges of the guides 2, 3 to prevent the disengagement of the tape.

The electrical leads of the magnetic heads are taken out of a commutator or slip rings which, for simplicity, are not shown. Further, the output of each head may be added or commutated by known techniques.

The exit end 33 of the guide 2 is preferably curved so that the tape and the friction roller 10 are aligned with each other. Obviously, if the tape and the roller are out of alignment, the tape will gradually move along the axis of the roller and become disengaged. If necessary, a guide bar may be inserted between the roller 10 and the exit end 33 so as to prevent lateral movement of the tape. The thinner the width of the tape, the more linear the shape of 33 may be. Links 4 and 5 are preferably bent as shown at 36, or attached to the shaft 8 obliquely in order that the tape may be introduced without obstacle. The heads 6 and 7 may be mounted on a cylinder, disc or conical surface.

If desired, a universal joint or such means may be employed between the capstan 23 and the axis of the motor for the upright engagement of the tape and the capstan. Some non-linearity of the rotation may be introduced in this case.

The sense of the rotation of heads can be arbitrarily chosen according to the relative position of the tape 1 and the capstan 23.

Figure 4:
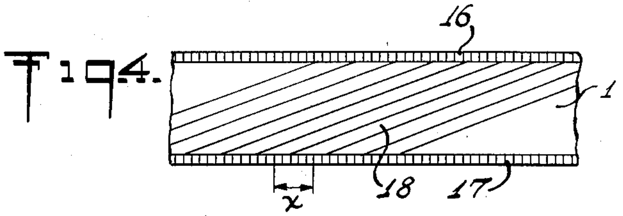
FIGS. 4 and 5 illustrate respectively the recorded single track and double track on the tape according to the invention.

As shown in FIG. 4, one recorded track according to the invention can be made very long. The recording of one field of the video signal, for example, is accomplished along one recorded track.

The opposite edges of the tape preferably coincides with the vertical blanking period. The rate of rotation of the head assembly 58 is therefore 30 r.p.s. Of course, 15 r.p.s. or so may be employed for a larger dimension of the guides 2 and 3. If, say, the guides 2 and 3 are one third of a circle as described above, the rate of rotation is 20 r.p.s.

The merit of this invention lies in a simple structure which does not require separate motors for the rotating head and the capstan, so that a rotation servo system for locking the phase of two motors is unnecessary. The engagement of the tape is simple and when the apparatus stops, there is no problem of damage to the surface of the magnetic tape.

The following numerical design data is given by way of example:

| | |
|---|---|
| Width of the tape | 2″. |
| Radius of the semi-circular guide | 8.4″. |
| Rotation of the head assembly | 30 r.p.s. |
| Relative velocity of the head and the tape | 1580″=132′ per sec. |
| Tape translation velocity | 15″ per sec. |

Diameter of the capstan $$d=\frac{15}{.30}=0.16''$$

This data shows that it is possible to record up to 4 mc. per sec., i.e. a full video signal. The shape of the exit end 33 in FIG. 1 is approximately linear in this case. The diameter of the capstan 23 of 0.16″ can be easily realized with usual materials. If it is desired to use a capstan having a larger diameter, the guides 2 and 3 may be a smaller fraction of a circle, or one track may include more than one field, as described above. Use of thinner tape would permit a thicker diameter of the capstan.

Though it is unnecessary to employ a servo system for the rotating head or the capstan, it is essential, of course, that the reproducing head trace the recorded track. If the tape is relatvely short or if the reproduction follows immediately after the recording, tracing is easily achieved without a servo correction system.

An elliptical cylinder 29 (FIG. 1) may be provided to adjust the length of the tape between the exit end 33 and the capstan 23 for complete tracking. The distance $x$ in FIG. 4 between adjacent tracks along the edge of the tape is about 0.225″. The adjustment in length produced by the cylinder 29 is a function of $x$.

Other suitable means for varying the effective length of the tape may be employed. For example, a post 11 in FIG. 1 bearing against the tape may be displaced manually. Also additional posts engaging the tape may be rotated or displaced so as materially to vary the length of the tape.

For rewinding the tape, roller 28 may be moved to the position as shown at 28′ in FIG. 1 and the friction roller 10 disengaged. Pneumatic air is preferably directed through holes (not shown) on the surface of the guides 2 and 3 in order to decrease the friction of the system.

FIG. 2 shows a modification of the apparatus shown in FIG. 1. The guide 35 is hollow and provided with small holes or slots in its inner surface. A suction pipe 34 is connected to a vacuum pump. The tape 1 is introduced into the inner surface of the guide 35, and the inner surface of the tape is scanned by the head assembly 58 as described with regard to FIG. 1. Instead of the vacuum suction of the tape, as shown, the tape may be forced against the inner surface of the guide 35 via a jet nozzle of air (not shown). Also an electrostatic force, say, 10,000 volts, may be impressed to attract the tape onto the guide 35. The rewinding can be performed by interruption of the air or voltage.

Figure 3:
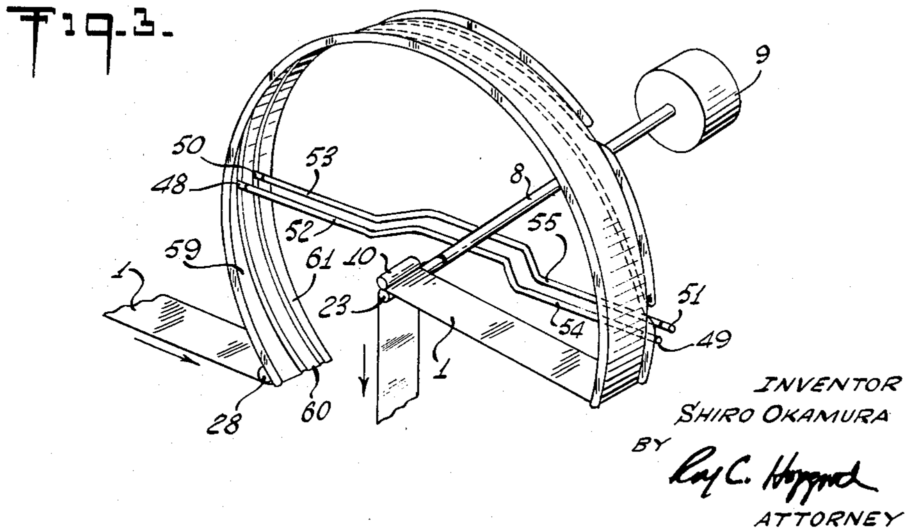
FIG. 3 is a simplified diagram of still another embodiment of the invention which enables double track recording.
Figure 5:
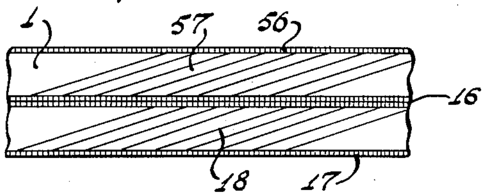

The apparatus shown in FIG. 3 is another modification of the apparatus shown in FIG. 1. In this embodiment two channels are recorded as shown in FIG. 5. Two sets of heads 48 and 49, 50 and 51 scan two channels simultaneously. The guide is separated into three portions 59, 60 and 61, which are supported by suitable means at the outer surface (not shown). The portions 16, 17 and 56 in FIG. 5 correspond to periods of vertical blanking. Apparatus suitable for more than two channels are also obtained in the same way. The apparatus shown in FIG. 3 is suitable, for example, for stereo television, color television, memory of computer, and other applications.

The apparatus shown in FIG. 1 is also capable of yielding the multi-track if the shape of the cross section of the guide is made elliptic. However, in this case the second track is recorded by the reversing of the tape as in the case of the audio tape recorder. Therefore, the inclination of the second tracks is opposite to the first track. In this case the track is not linear, strictly, but is sinusoidal.

Figure 6A:
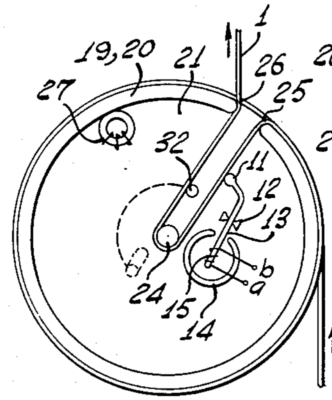
FIGS. 6A and 6B are simplified elevation and side views of another embodiment of the invention utilizing a single rotating head.
Figure 6B:
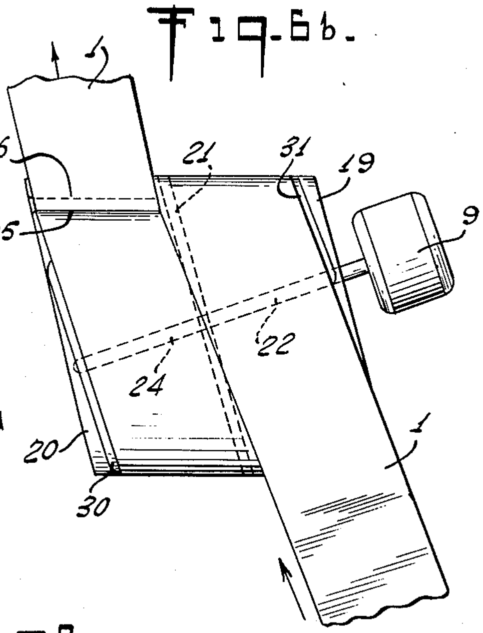

FIGS. 6A and 6B show a video tape recorder with a single rotating head according to the invention. The magnetic tape 1 is wound around fixed circular cylinders or elliptical cylinders 19 and 20, between which a rotating head 27, as suggested by the wound toroid, scans the inner surface of the tape 1. The tape is driven via the edge 25 of the cylinder, capstan 24 connected to the head disc 21 and edge 26. The recorded track is the same as shown in FIG. 4 or sinusoidal curves (in the case of the elliptic cylinder). In this apparatus the head rotates usually 60 r.p.s. for recording one field along one track. If the tape is pulled at a velocity of 15″ per sec. the diameter of the capstan is 0.08″, assuming the rotating head disc 21 is connected directly to the capstan shaft as shown in FIG. 6. If the track contains one frame instead of one field, the diameter of the capstan should be 0.16″. If the edges 25 and 26 of the guide cylinder 20 are properly shaped and if the cylindrical guides 20 and 19 have elliptical cross sections as shown, the axis of the capstan and also of the head disc being oblique as shown, the tape is easily introduced. The adjusting of the tape length is accomplished, for example, by a moving post 32 as shown. Rewinding of the tape 1 is accomplished, for example, by moving the post 32 in the direction of the dotted line, thus releasing the engagement between the tape and the capstan. Pneumatic means between the tape 1 and the cylindrical guides 19 and 20 are also preferred.

The rotating head can be rotated around the outer surface of the guides 19 and 20, which may be an integral body in this case. The tape would then be scanned on its outer surface.

As is well known, when tape is stored for a long time, it expands or contracts as a result of variations in temperature and humidity. In such case, adjustment of the tape length by the above described manual means 29 or 11 is not sufficient, and automatic means are required.

For example, a control signal may be derived by phase comparing the output signal from a control track recorded along one edge of the tape and a periodic signal derived from the rotating head assembly, as is conventional. The comparison signal relative to the phase lead or lag is fed to the coil 15 over the terminals $a$, $b$ in FIG. 1. An iron piece 13$a$ attached to the rod 13 moves the pole faces of a magnet 14 in accordance with the current variation corresponding to the phase comparison signal. The construction resembles a D.C. meter. By proper choice of voltage polarity, the post 11 is moved upwardly or downwardly about the fulcrum 12 so as to decrease the phase difference between the control track signal and the signal corresponding to the rotation of the head. The tape is biased by the post 11 at a balanced condition. If the phase of the recorded control track lags relative to the head rotation, post 11 is moved upwardly. A damping means, such as an oil damper, may be used to avoid the hunting effect.

Other suitable means such as a D.C. motor may be also useful instead of the apparatus shown for moving the post 11. Further, the elliptic cylinder may be rotated by the above described means.

The servo system above shown is applicable also to the apparatus shown in FIGS. 2, 3 and 6. In FIG. 6A this is shown at 11, 12, 13, 14 and 15.

The means above described are, however, not suitable for the case of the elongation or contraction along the total length of the tape. They are only suitable for partial deformation of the tape. For the deformation of the tape of a wide range, the translation velocity of the capstan must be modified.

Figure 7:
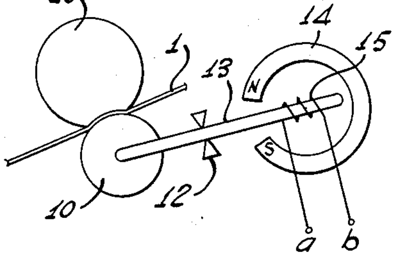
FIG. 7 shows a system of a tape velocity servo according to the invention.

FIG. 7 shows an elastic capstan made of, say, rubber or plastic material pressed elastically by controlled friction roller 10. 10 is moved toward or from the tape and the capstan by means of a servo system, say, 12, 13, 14 and 15 as shown in FIG. 1. The diameter of the capstan can be varied largely according to the controlled signal, thus producing the required servo action.

The thickness of the capstan is also adjustable by controlling its temperature. In this case a material of high expansion coefficient is suitable.

Figure 8A:
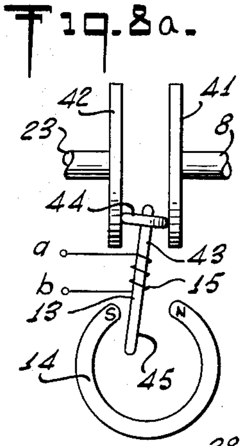
FIGS. 8A and 8B are simplified views of another system of the tape velocity servo according to the invention.
Figure 8B:
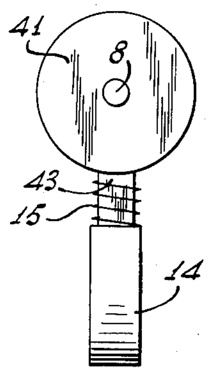

FIGS. 8A and 8B show another method of modifying the velocity of the capstan. The shaft of the motor is connected to a disc 41, the disc 42 being connected to the capstan. Between 41 and 42 there is an idler ring 44 which is rotatable about a shaft 43 by the electromagnetic controlling apparatus 13, 14 and 15 as shown above, to produce a servo action due to the control current from the terminals *a* and *b*. The discs 41, 42 are urged towards each other by spring tension.

Figures 9A, 9B:
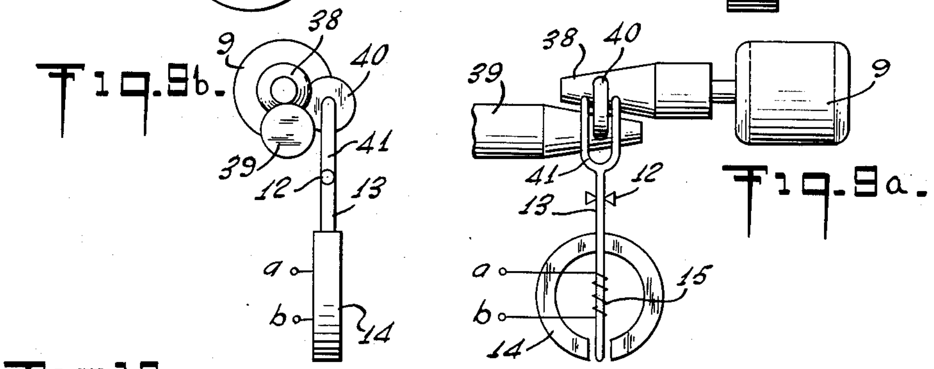
FIGS. 9A and 9B are simplified elevation and side views of still another embodiment of the tape velocity servo.

FIGS. 9A and 9B show another method which enables the variation of the capstan rotating velocity by two conical shafts 38 and 39, which are respectively connected to the head drum motor 9 and to the capstan. Between the shafts 38 and 39 there is an idler ring 40 supported by a bearing 41 which is connected to, say, the electromechanical control system 12, 13, 14 and 15. The control signal moves the ring 40 to the right or left thus varying the rotating velocity of the capstan. The servo systems shown in FIGS. 1, 7, 8 and 9 can also be controlled manually.

The magnetic tape recorder according to the present invention is characterized by a simple structure, requiring only a single motor. A precise capstan servo system, therefore, is not always required. The mounting, demounting and rewinding of the tape can be easily performed. There is only a slight possibility of damage occurring to the surface of the tape when the equipment comes to a stop. The effect of a wow or flutter is minimized because of the unique construction of the invention and because of the large moment of inertia of the head disc. The number of heads is arbitrarily chosen as described above. Generally, the more heads used, the larger should be the diameter of the head disc and the lower the number of revolutions of the head disc. If the width of the tape is small, the velocity of the tape must be large, and the diameter of the capstan must also be larger.

The control signal of the tape can also be derived from other suitable means which measures the relative velocity between the capstan and the tape.

Figure 10:
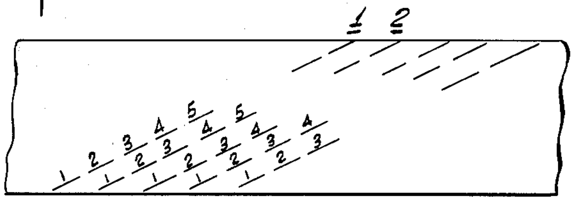
FIGS. 10 and 12 show recorded tracks suitable for a non-servo system.

The recorded track can be made as shown in FIG. 10. The number on each line represents the position of the line on the frame. It is observed that each line on succeeding frames is in alignment. If the overall response of the adjacent tracks 1 and 2 in FIG. 10 are as shown at 1 and 2 in FIG. 11, the tracking of the reproducing head is unnecessary, because at every point between the tracks 1 and 2 the output of the reproducing head is constant and exhibits the interpolation effect between the information of 1 and 2. This characteristic shown in FIG. 11 is realized, say, by the reproducing head having a wider width or by merging the recorded tracks into each other.

Merging tracks having such properties obviate the necessity of a servo system. No capstan servo is necessary. Only the head assembly is locked in phase to the vertical frequency while recording. Therefore, the system for producing the tracks as shown in FIGS. 10 and 11 permit the use of an extremely simple structure of the video tape recorder.

Figure 12:
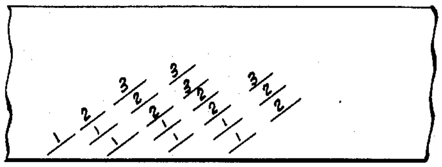

If one field is recorded instead of one frame along one track, interlacing of tracks may be produced as shown in FIG. 12.

Figure 11:
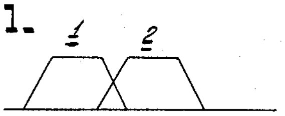
FIG. 11 shows the overlap of adjacent tracks utilized in the invention.

The system according to FIGS. 10 and 11 is capable also of providing the effect of slow motion and quick motion. If the tape is translated more slowly upon reproducing than upon recording, then slow motion results. The converse would produce quick motion. This may be effected by varying the diameter of the capstan.

The apparatus shown above can be modified to transmit the tape in the reverse direction. This, of course, produces reverse movement of the images. For example, if the tape from the input side 23 rather than from the outlet end 33 (FIG. 1) is passed around capstan 23, the reverse motion will be produced. The capstan may also be mounted before the tape is passed around the guide for producing a reversible motion.

Figure 13:
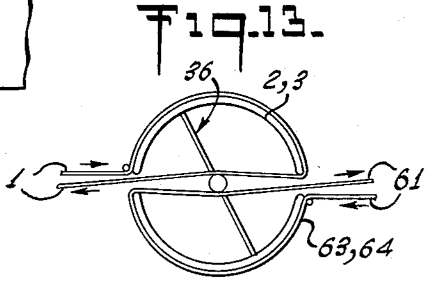
FIG. 13 is a simplified diagrammatic view of an adaption of the invention.

If guides similar to the guides 2 and 3 in FIG. 1 are provided on the opposite side so as to form a full circle as shown at 63 and 64 in FIG. 13, two tapes 1 and 65 may be driven at the same time using the same mechanism. Further, the recorded information may be mixed or separated. Systems for more than two tapes are also possible. The novel structure may be used for recording color or stereo video signals.

It is to be understood that any one of the modifications illustrated in FIG. 2 and FIG. 3 may in part be adopted in other of the modifications.

The system according to the present invention is also applicable to the electrostatic and other recording techniques.

The application of this invention is not restricted to video recording, but is applicable to sound, data and other information such as radar signals. It is also suited to the memory of the computing apparatus.

What is claimed is:

1. A tape recording mechanism comprising
a tape guide having an arcuate surface,
means for feeding a magnetic tape along the surface of said guide,
means including a capstan mounted on a rotatable shaft for advancing said tape along said guide, said tape being engaged by said capstan after the same leaves said guide, said shaft being skewed with respect to the longitudinal axis of said arcuate surface,
and means for scanning said tape with at least one magnetic head, said head also being mounted on said shaft to thereby accurately scan a pattern of substantially parallel recorded information tracks on said tape, said tracks being oblique to the direction of movement of said tape.

2. The mechanism according to claim 1, wherein said guide comprises a hollow member through which said tape is passed, said hollow member including an inner arcuate member and a substantially concentric outer arcuate member, a plurality of apertures in said inner member provided for the passage of air, and means connected to said outer member for providing a pressure differential within said hollow member to thereby change the friction between said tape and said guide.

3. The mechanism according to claim 1 which includes a plurality of arcuate guides positioned about the axis of rotation of said rotatable member, each guide having a separate magnetic tape adapted for movement thereover, and at least one head adapted for cooperation with each of said tapes to cause magnetic interaction between each tape and its associated head to thereby simultaneously scan a plurality of tapes as said heads are rotated.

4. The mechanism according to claim 3 wherein two arcuate guides are positioned in circular arrangement, each guide forming substantially half a circle.

5. The mechanism according to claim 1 which further includes means for detecting a phase deviation between a signal indicative of the speed of said capstan and the signal recorded on said tape, and means responsive to said phase deviation detecting means to automatically correct for said deviation by changing the speed of at least a portion of said tape upon playback 6. The mechanism according to claim 5 wherein said correcting means includes electromagnetically actuated means for varying the length of tape between said guide and said capstan in accordance with the detected deviation.

7. The mechanism according to claim 5 wherein said correcting means includes a variable speed arrangement comprising a first rotatable element connected to a motor, a second rotatable element connected to said capstan and a mechanical idler positioned to transmit a rotating force from said first element to said second element, and electromagnetically actuated means for varying the position of said idler with respect to said elements to thereby change the speed of said capstan and said tape.

References Cited by the Examiner

UNITED STATES PATENTS

| | | | |
|---|---|---|---|
| 2,089,003 | 8/37 | Sack | 74—193 |
| 2,773,120 | 12/56 | Masterson | 179—100.2 |
| 2,854,526 | 9/58 | Morgan | 179—100.2 |
| 2,909,616 | 10/59 | Marty | 179—100.2 |
| 2,936,638 | 5/60 | Wassilieff | 74—200 |
| 2,943,852 | 7/60 | Quirk | 226—191 X |
| 2,977,422 | 3/61 | Pear | 179—100.2 |
| 2,984,398 | 5/61 | Chalmers | 179—100.2 |
| 2,998,495 | 8/61 | Maxey | 179—100.2 |
| 3,028,449 | 4/62 | Power et al. | 179—100.2 |

FOREIGN PATENTS

| | | |
|---|---|---|
| 788,862 | 1/58 | Great Britain. |
| 1,188,391 | 9/59 | France. |

IRVING L. SRAGOW, *Primary Examiner.*

ELI J. SAX, BERNARD KONICK, *Examiners.*